US012093582B2

(12) United States Patent
Morales

(10) Patent No.: US 12,093,582 B2
(45) Date of Patent: Sep. 17, 2024

(54) METHODS AND PRINTING SYSTEM FOR PEER-TO-PEER RESOURCE MANAGEMENT

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/994,533

(22) Filed: Nov. 28, 2022

(65) Prior Publication Data

US 2023/0146892 A1 May 11, 2023

Related U.S. Application Data

(63) Continuation of application No. 17/523,328, filed on Nov. 10, 2021, now Pat. No. 11,544,018.

(51) Int. Cl.
*G06F 3/12* (2006.01)
(52) U.S. Cl.
CPC .......... *G06F 3/1225* (2013.01); *G06F 3/1204* (2013.01); *G06F 3/1292* (2013.01)
(58) Field of Classification Search
None
See application file for complete search history.

(56) References Cited

U.S. PATENT DOCUMENTS

| | | | |
|---|---|---|---|
| 4,943,996 A | 7/1990 | Baker et al. | |
| 7,847,956 B2 | 12/2010 | Farrell et al. | |
| 2004/0143651 A1 | 7/2004 | Allen | |
| 2006/0031585 A1* | 2/2006 | Nielsen | H04L 69/08 |
| | | | 709/246 |
| 2021/0117741 A1 | 4/2021 | Eguchi | |
| 2021/0409557 A1* | 12/2021 | Kosaka | H04N 1/387 |

* cited by examiner

*Primary Examiner* — Frantz Bataille
(74) *Attorney, Agent, or Firm* — Millen, White, Zelano & Branigan P.C.; William F. Nixon

(57) ABSTRACT

A peer-to-peer network of printing devices is configured to share information and color printing resources, such as TRCs, spot colors, and ICC profiles, as well as paper catalogs within the network without the need for a centralized server or cloud service. The digital front ends (DFEs) of the printing devices manage printing device information which is made available to all printing devices. When an update occurs at a printing device within the peer-to-peer network, its DFE sends a signal to the other printing devices to synchronize their information with the updated information. When a new printing device is added to the peer-to-peer network, its information and color printing resources are merged or replaced with the information within the network.

20 Claims, 8 Drawing Sheets

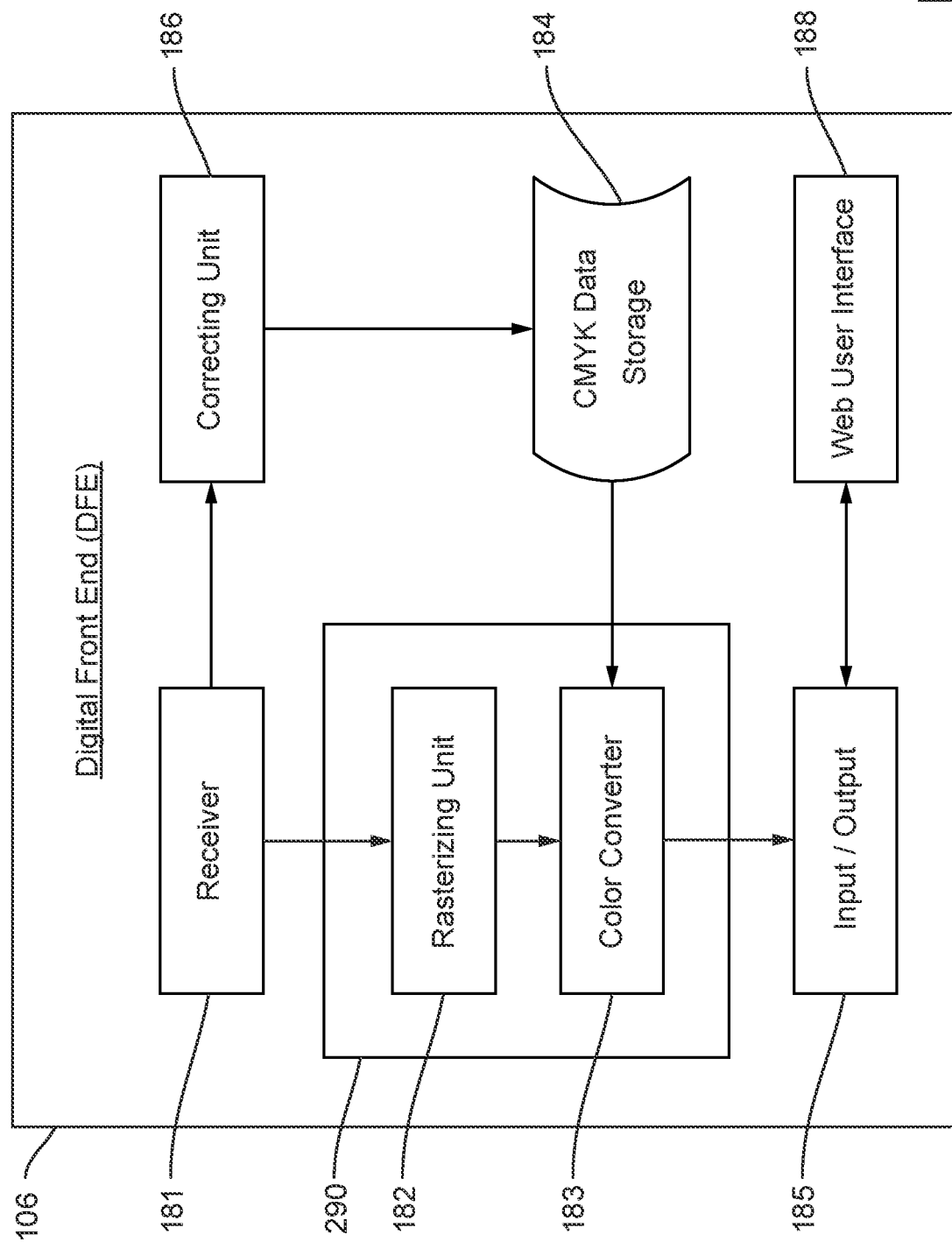

METHODS AND PRINTING SYSTEM FOR PEER-TO-PEER RESOURCE MANAGEMENT

FIELD OF THE INVENTION

The present invention relates to peer-to-peer management of color printing resources within a color printing system.

DESCRIPTION OF THE RELATED ART

Print shops having multiple printing devices need to keep the configuration of the printing devices in sync with each other. This operation is usually performed with an external server that retrieves and pushes configuration information to the printing devices. While synchronization of the system configuration is useful to any print shop that has at least two printing devices, the expense of a centralized server may be prohibitive as a stand-alone product. The functionality may be added to output management products. This approach, however, drives up the cost as the customers that want printing device synchronization must also purchase an expensive output management server. In some cases, the synchronization is unidirectional in that settings can be pushed to the printing devices but updates from the printing devices are not retrieved by the centralized system.

Some products offer resource management and synchronization functionality as a cloud service. This feature may reduce the cost to enable resource and printing device synchronization but it also requires a persistent connection to the internet. As such, this sort of solution may be problematic in secure environments that do not want printing devices communicating with the internet. It also may be problematic for printing devices in locations without robust internet infrastructure.

SUMMARY OF THE INVENTION

A method for managing printing operations is disclosed. The method includes connecting a digital front end (DFE) of a second printing device to a DFE of a first printing device to form a peer-to-peer network. The DFE of the first printing device includes a first set of color printing resources and the DFE of the second printing devices includes a second set of color printing resources. The method also includes synchronizing printing device information between the DFE of the first printing device and the DFE of the second printing device. The printing device information includes the first set of color printing resources and the second set of color printing resources. The method also includes detecting a change in the first set of color printing resources. The method also includes updating the printing device information at the DFE of the first printing device with the change in the first set of color printing resources. The method also includes sending a signal within the peer-to-peer network to the DFE of the second printing device from the DFE of the first printing device based on the change in the first set of color printing resources. The method also includes updating the printing device information at the DFE of the second printing device with the change in the first set of color printing resources.

A method of managing color printing resources between a plurality of printing devices is disclosed. The method includes connecting a digital front end (DFE) of a second printing device to a DFE of a first printing device to form a peer-to-peer network. The DFE of the first printing device includes a first paper catalog and the DFE of the second printing device includes a second paper catalog. The method also includes synchronizing the first paper catalog and the second paper catalog such that color printing resource information for each paper catalog is available within the peer-to-peer network. The method also includes updating an entry in the first paper catalog at the DFE of the first printing device. The method also includes sending a signal from the DFE of the first printing device to the DFE of the second printing device based on the updated entry of the first paper catalog. The method also includes updating an entry of the second paper catalog at the DFE of the second printing device with the updated entry of the first paper catalog.

A peer-to-peer printing device network is disclosed. The peer-to-peer printing device network includes a first printing device having a digital front end (DFE). The DFE includes a first set of color printing resources. The peer-to-peer printing device network also includes a second printing device having a DFE. The DFE includes a second set of color printing resources. The peer-to-peer printing device network includes a connection between the DFE of the first printing device and the DFE of the second printing device. The DFE of the first printing device is configured to synchronize printing device information including the first set of color printing resources and the second set of color printing resources between the DFE of the first printing device and the DFE of the second printing device. The DFE of the first printing device also is configured to detect a change in the first set of color printing resources. The DFE of the first printing device also is configured to update the printing device information at the DFE of the first printing device with the change in the first set of color printing resources. The DFE of the first printing device also is configured to send a signal with the peer-to-peer printing device network to the DFE of the second printing device from the DFE of the first printing device based on the change in the first set of color printing resources. The DFE of the first printing device also is configured to update the printing device information at the DFE of the second printing device with the change in the first set of color printing resources.

BRIEF DESCRIPTION OF THE DRAWINGS

Various other features and attendant advantages of the present invention will be more fully appreciated when considered in conjunction with the accompanying drawings.

FIG. 1B illustrates a digital front end (DFE) for a printing device according to the disclosed embodiments.

DETAILED DESCRIPTION OF THE PREFERRED EMBODIMENTS

Figure 1A:
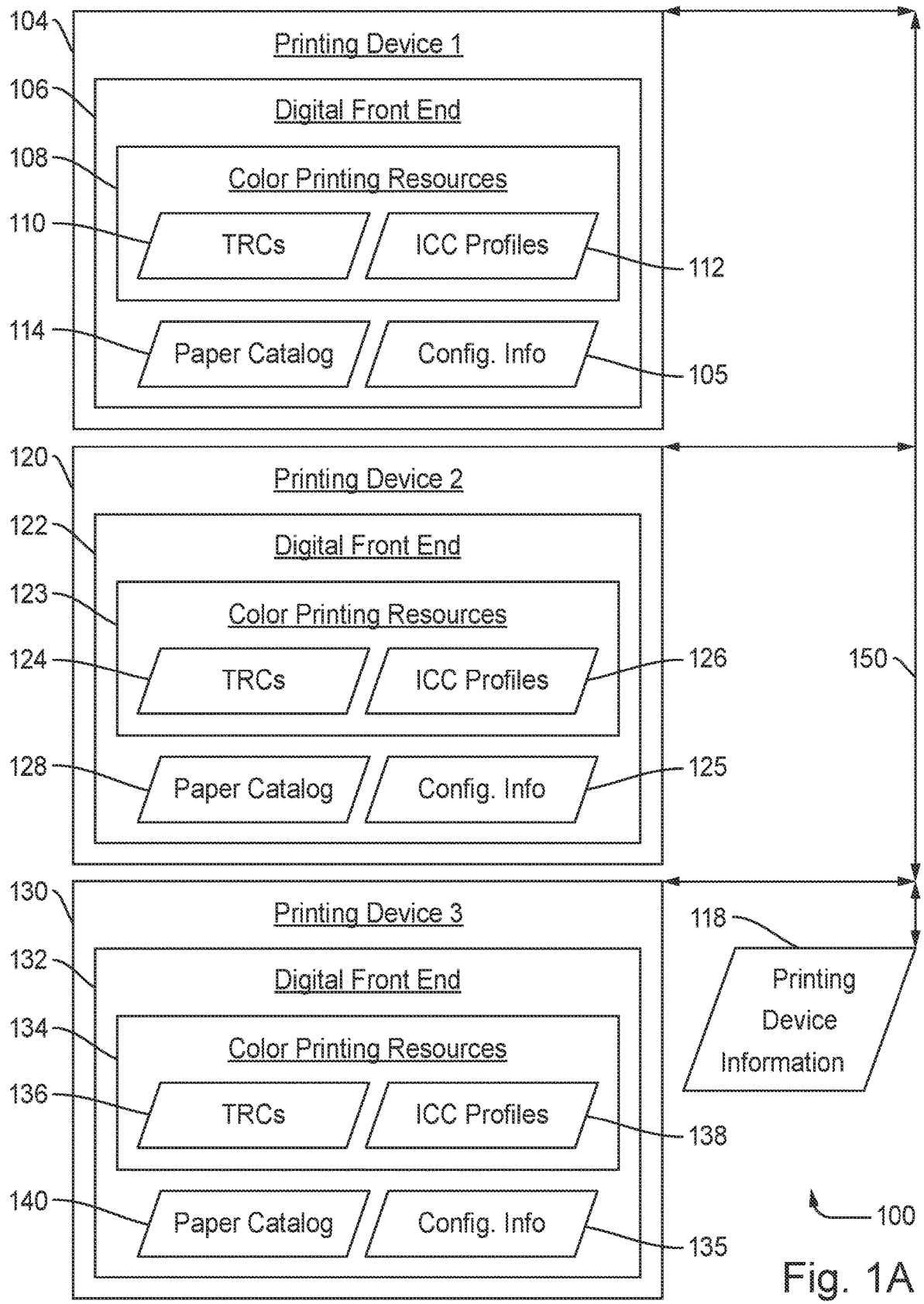
FIG. 1A illustrates a printing system for printing documents in a peer-to-peer network according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Multiple printing devices within a print shop will synchronize the configuration information of the printing devices with each other. This configuration information may include paper catalogs, print queues, hot folders, ICC profiles, paper tray configurations, general print engine settings, and the like. To implement the distribution of such configuration information, a peer-to-peer system would be advantageous. Multiple printing devices would synchronize configuration information and resources with each other without requiring traffic outside the printing network.

The disclosed embodiments implement a printing system in which printing devices share information and use that information to enable synchronization functions without the need of a separate output management server. Although the disclosed printing system may enable the functionality in terms of the XML-based job messaging format (XJMF) protocol used in production printing environments, this functionality may be enabled using any protocol that enables print submission, such as SMB printing, IPP, LPR, and the like. The functionality also may be enabled via any protocol that provides printing device information, such as SNMP, REST API, and the like.

In order to enable synchronization, the printing devices, or, more specifically, the DFEs that control the printing devices, are connected to each other. As such, the DFE will allow the operator the option to browse for printing devices in the network and to establish connections to the printing devices. Once the DFE adds another printing device, it establishes a connection to receive both job and printing device status from the other DFE. The DFE also establishes a connection to send information to the other printing device. This action may be done via polling. Alternatively, some embodiments may enable subscriptions so that each printing device automatically sends signals to the other printing device.

Once the connection is established, both printing devices may retrieve the following types of information:
Paper catalog;
Print queues;
Hot folders;
ICC profiles;
Fonts;
Spot color definitions;
Paper tray configurations;
General DFE settings; and
Other more general print engine settings.

When a printing device is added to a DFE group, the system may choose to either merge or replace the added printing device's information with the group.

If the added printing device is configured to replace information then it will discard its information in favor of the information from the group of printing devices. If the printing device is configured to merge the information, then it will combine its information with the information from the printing device group. If there is a conflict between the two sets of resources, then the printing system may prompt the operator to choose which resource has higher priority. Alternatively, the DFE may be configured to select itself or the DFE group as the priority resource. Once the configuration and resources are merged, the information is set to the group so that other DFEs may update their information with the updated information. Thus, the disclosed embodiments provide peer-to-peer printing device configuration and resource synchronization.

After synchronization, if any resource is updated in any printing device in the group, then that printing device will send signals to other printing devices with the updated information. The other printing devices will update their resources to match the printing device. Whenever one of the resources listed above is added, removed, or edited, a signal may be sent to the other printing devices in the DFE group that would cause the synchronized resources in the other printing devices to update. The disclosed embodiments enable resource synchronization for printing devices without requiring a centralized synchronization server, in either an output management product or in a cloud service.

FIG. 1 depicts a printing system 100 for printing documents using printing devices 104, 120, and 130 in a peer-to-peer network according to the disclosed embodiments. Printing system 100 may be located in a print shop or other environment suitable for production printing operations. Printing system 100 includes one or more printing devices 104, 120, and 130 that receive print jobs from one or more client devices.

A peer-to-peer network may be used by system 100 to exchange data between the devices within system 100. The devices are configured to communicate over a physical communications interface or layer such as air interfaces and/or a direct wired connection. Air interfaces may be an given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family) Alternatively, the peer-to-peer network of the printing devices may be a local area network, wide area network, an ad-hoc network. Printing devices 104, 120, and 130 exchange data using the appropriate protocol.

Printing device 104 is an example printing device and is disclosed in greater detail below. Printing devices 120 and 130 may include the features disclosed for printing device 104. It includes an embedded digital front end (DFE) 106, or a printing device controller, that is the workflow touchpoint which accepts a print job, or print file, commonly a PDF or PostScript file. DFE 106 converts the file of a received print job into a format that print engine 260, disclosed below, can use to lay down the content of the document corresponding to the print job on a media. DFE 106 may include a raster image processor (RIP) as well as other components. DFE 106 also may schedule when a received print job is processed and other operations related to printing operations. DFE 106 is disclosed in greater detail below.

DFE 106 may store certain information about printing device 104. Configuration information 105 may include data on print queues, hot folders, paper tray configurations, and other general print engine settings. DFE 106 also may store color printing resources 108. Color printing resources 108 are disclosed in greater detail below and include tone reproduction curves (TRCs) 110 and ICC profile 112. TRCs 110 and ICC profiles 112 are used to reproduce colors in printing operations at printing device 104. Color printing resources 108 also may include settings for the TRCs and ICC profiles, as well as ink limits, and the like. DFE 106 also may include paper catalog 114 for the papers and media used at printing device 104. Paper catalog 114 is disclosed in greater detail below.

Printing devices 120 and 130 include similar features. Printing device 120 includes DFE 122, which stores configuration information 125 as well as color printing resources 123 and paper catalog 128. Color printing resources 123 of printing device 120 include TRCs 124 and ICC profiles 126. As can be appreciated, configuration information 125, color printing resources 123, and paper catalog 128 stored by DFE 122 of printing device 120 most likely differs from configuration information 105, color printing resources 108, and paper catalog 114 of printing device 104. Each printing device includes its own specific information about its configuration and color reproduction capabilities.

Printing device 130 includes DFE 132, which stores configuration information 135, color printing resources 134, and paper catalog 140. Color printing resources 134 include TRCs 136 and ICC profiles 138. The data for these features most likely differs from the information stored in DFEs 106 and 122.

Printing device 104, 120, and 130 are connected in a peer-to-peer network that enables them to share information and use that information to synchronize functions without the need of a separate output management server. In order to enable synchronization, DFEs 106, 122, and 132 are connected to each other. The DFEs allow the operator the ability to browse for printing devices in system 100 and to establish connections to them.

For example, DFE 106 may be used to browse for printing devices 120 and 130. Printing device 120 may be added to the peer-to-peer network with printing device 104. DFE 106 may establish a connection 150 to send information to printing device 120 to receive both job and printing device status from DFE 122. DFE 106 also may use connection 150 to send the same information about printing device 104 to DFE 122. Preferably, this feature is enabled using subscriptions so that each printing device, or DFE, automatically sends signals to the other printing device. When a change occurs, such as at printing device 104, DFE 106 sends a signal to DFE 122 as it subscribes to it in the peer-to-peer network.

After the connection between printing devices 104 and 120 is established, printing device 130 may be added to the peer-to-peer network using connection 150. Again, the information is exchanged and subscriptions enabled to allow the printing devices to exchange information. Using subscriptions between the printing devices in the peer-to-peer network, a persistent connection does not need to be kept running. The DFEs can communicate with each other directly.

The information exchanged between the printing devices within the peer-to-peer network may be merged into printing device information 118. Printing device information 118 may be a data file shared between printing devices 104, 120, and 130. Thus, every printing device stores the pertinent information for the other printing devices. Printing device information 118 also is synchronized with the configuration information, color printing resources, and the paper catalogs of the printing devices. Thus, printing device information 118, for example, includes configuration information 105, 125, and 135, color printing resources 108, 123, and 134, and paper catalogs 114, 128, and 140.

When a printing device is added to the peer-to-peer network of printing devices, system 100 may choose to either merge or replace the added printing device's information with printing device information 118. If the added printing device is configured to replace information, then it will discard its information in favor of printing device information 118 from the peer-to-peer network of printing devices 104, 120, and 130. If the added printing device is configured to merge its information, then it will combine its configuration information, color printing resources, and paper catalog with printing device information 118. If there is a conflict with printing device information 118, then system 100 may prompt the operator to choose which resource has the higher priority. Alternatively, the DFE of the added printing device may be configured to select itself over printing device information 118 or vice versa. Once the configuration information, color printing resources, and paper catalogs are merged, printing device information 118 is sent to the peer-to-peer network so that the other DFEs may update their information. All of these operations may occur at the DFEs of the printing devices.

After synchronization, if any resource or information is updated in any printing device, then that printing device will send signals to the other printing devices with the updated information. The other printing devices will then update their resources to match the sending printing device. Again, subscriptions may be used. Further, printing device information 118 may updated at each printing device.

FIG. 1B depicts a block diagram of DFE 106 according to the disclosed embodiments. The features disclosed by FIG. 1B also may apply to DFEs 122 and 132. DFE 106 includes a receiver 181, an RIP firmware 290 including rasterizing unit 182 and a color converter 183, an CMYK data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also stores configuration information 105, color printing resources 108 and paper catalog 114, even though these are not shown in FIG. 1B.

Receiver 181 receives a print job received within system 100 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs) 110. A TRC refers to data indicating the relationship between a colored gradation value for rendering data and print color, or print density, on a given print medium.

When print color provided by printing device 104 alters over time, the TRCs stored in RGBY data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in RGBY data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in RGBY data storage 184 is replaced with the generated TRC. Correcting unit 186 may correct the TRC. Correcting unit 186 may rewrite a part of the TRC stored in RGBY data storage 184 to thereby correct the TRC.

RIP firmware 290 includes rasterizing unit 182 and color converter 183. The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with printing devices 120 and 130 using, for example, input/output connector 185. Web user interface 188, or web application, allows a user of the DFEs of other printing devices to interact with content or software running on DFE 106.

Figure 2:
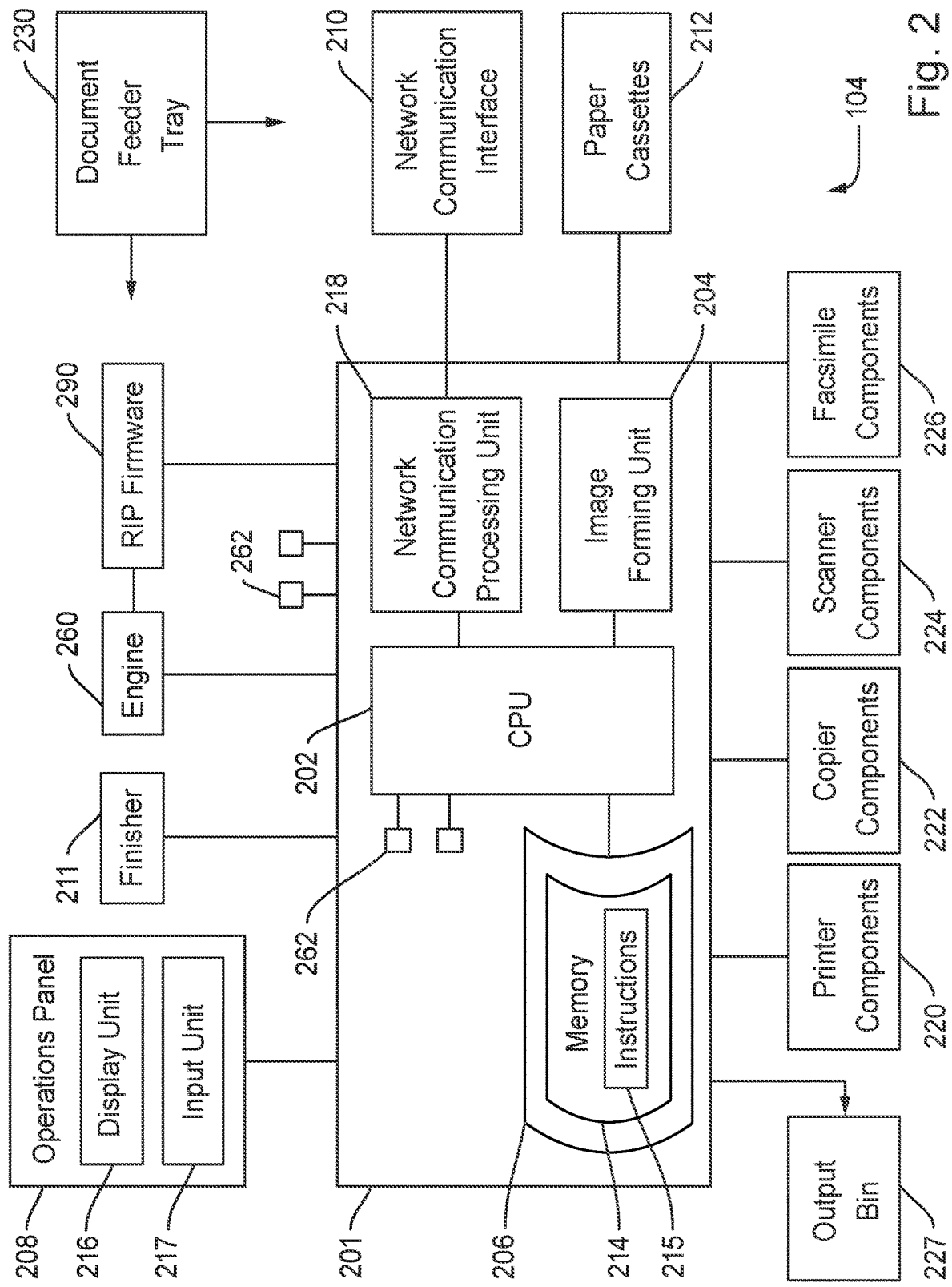
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100, such as printing devices 120 and 130. As disclosed above, printing device 104 may send and receive data from DFE 122 of printing device 120 and DFE 132 of printing device 130, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. The information for printing these papers may be captured in paper catalog 114. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with client devices 110 and 112 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from printing device 120 and 130 as well as other printing devices establishing a connection 150 to establish the peer-to-peer network.

Figure 3:
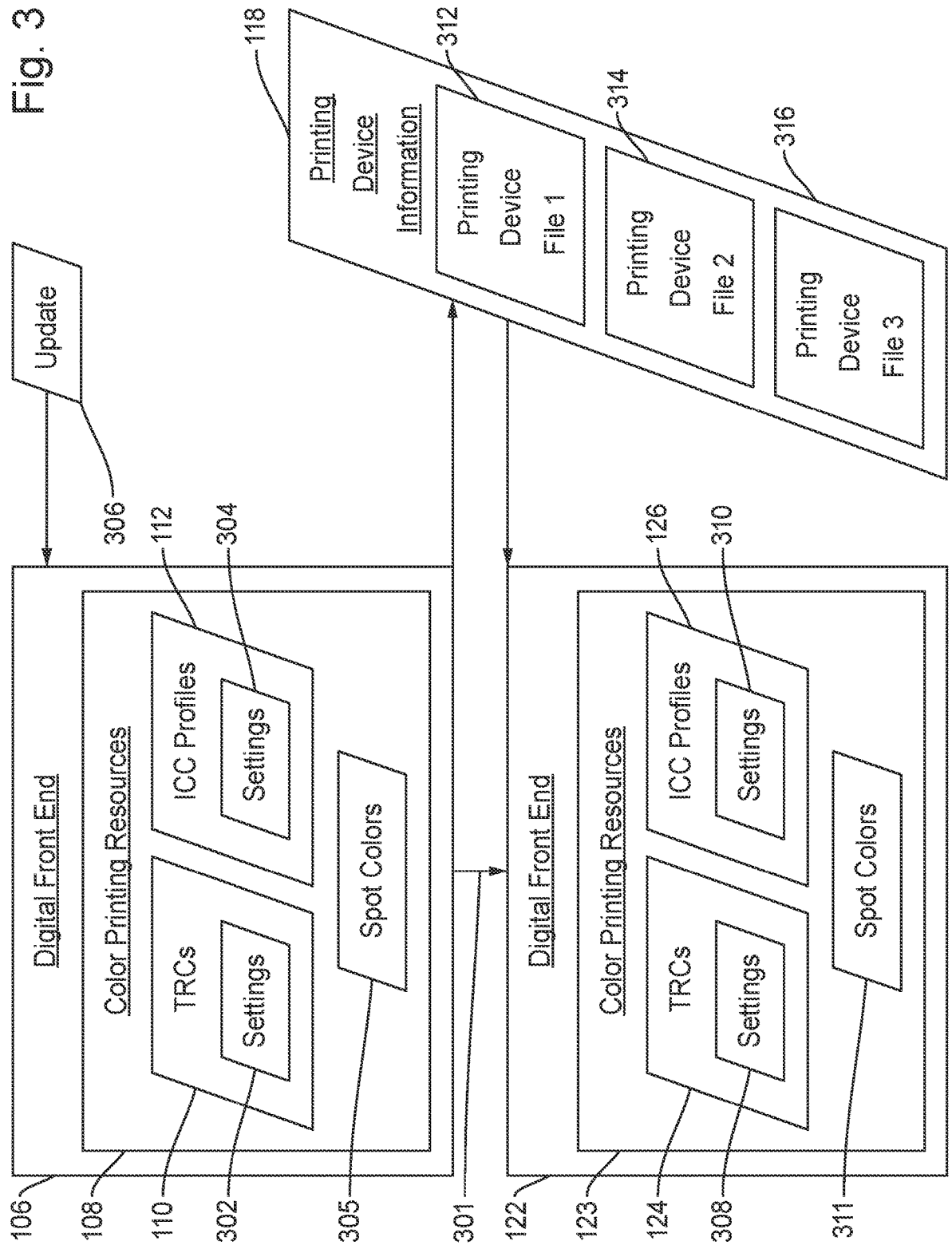
FIG. 3 illustrates a block diagram of color printing resources being updated in the peer-to-peer network according to the disclosed embodiments.

FIG. 3 illustrates a block diagram of color printing resources being updated in the peer-to-peer network of the printing devices of system 100 according to the disclosed embodiments. As disclosed above, printing device 104 may include color printing resources 108, printing device 120 may include color printing resources 123, and printing device 130 may include color printing resources 134. For illustrative purposes, color printing resources 108 of printing device 104 may be disclosed below, but the features disclosed with relation to color printing resources 108 also may apply to color printing resources 123 and 134. It also should be noted that the disclosed embodiments may apply to monochrome printing devices such that printing resources may be used instead of color printing resources. For example, printing resources may not include ICC profiles 112. Even without printing colors, the disclosed processes are applicable. The term "color printing resources" is used below for simplicity and clarity.

Color printing resources refer to spot colors, TRCs and ICC profiles that serve to reproduce color during printing operations. Color transformation, also referred to herein as color space conversion or color conversion, involves transforming the representation of a color from one color space to another color space. In some implementations, a device-independent intermediary space is used for the conversion between a source color space and a destination color space. To help simplify and standardize color transformations, the International Color Consortium (ICC) developed a set of standards that is used to create ICC profiles that characterize different color spaces. Under the terminology set by the ICC, color conversion typically involves using a source ICC profile to convert the source color space into a profile connection space (PCS) and using a destination ICC profile to derive the destination color space based on input colors from the PCS. The PCS can use either the CIELAB (L*a*b* color space) or the CIEXYZ color space for color conversions.

Some color transforms are governed by well-defined mathematical equations, such as from a red, green, and blue (RGB) color space to a device-independent color space (e.g., the XYZ color space). Other color transforms lack these mathematical equations and instead utilize one or more look up tables (LUTs), which each convey local empirical correspondences that can be used to map one color space to another. For example, to convert from the L*a*b* color space to the CMYK color space, a three-dimensional look up table (3D-LUT) can be used. In the L*a*b* color space, colors are expressed using three components: a L* component, an a* component, and a b* component. Each of these components is represented by an 8-bit integer, which results in 256 total possible values for each component. A complete 3D-LUT for the color conversion would therefore include 256-by-256-by-256 inputs, and a corresponding 4-byte CMYK output for each input. As such, an ICC profile may include one or more well-defined mathematical equations and/or one or more LUTs for use during color conversion between color spaces.

For color printing, an ICC profile is used as the destination ICC profile within a typical ICC color conversion workflow that enables color conversion from input colors to CMYK ink combinations that the printing device can print. Particularly, the ICC profile is used to convert from PCS device-independent colors (e.g., CIE L*a*b*) to CMYK quantities that the printer can replicate within the printing process. Thus, during the creation of an ICC profile, standard profile maker software tools are configured to identify CMYK ink combinations that are the best matches for the input PCS colors. The CMYK ink combinations identified by the software are then used within one or more 3D-LUTs stored by the ICC profile to enable mapping input L*a* b* quantities from the PCS to output CMYK ink combinations.

The color appearance of printing device inks on different types of papers can differ substantially, which can be attributed to various parameters, such as how the ink interacts with the paper, the exact "white" color of the paper that affects human color visual response, the physical appearance of the paper, and the amount of ink the paper can hold. For example, an uncoated sixty pound paper may have a maximum 225% ink limit while a glossy, gelatin-coated one hundred pound card stock may have a 330% ink limit. Thus, to enable accurate color reproduction under ICC color management, each ICC profile typically factors the specific paper type and printing pipeline combination (e.g., all of the color and image processing, half-toning, and physical setting of the printing mechanism, including inks and colorants used).

Existing ICC profile maker software typically requires substantial inputs (e.g., measurements from thousands of printed color patches), time, and resources to create an ICC profile that accommodates a print job that involves a new paper type for a particular type of printing device (e.g., a production printer model). For example, generating an ICC profile typically requires using a colorimeter or a spectrophotometer to measure thousands of printed patches to develop the mapping from a color space to the PCS, and from the PCS to the color space. Overall, creating a new ICC profile for a model of printing device is usually a laborious process.

Referring to FIG. 3, color printing resources 108 includes TRCs 110 and ICC profiles 112 as well as spot colors 305. Spot colors also may be known as solid colors and are related to any color generated by an ink that is printed. Discrete colors may have given names or numbers. Thus, spot colors 305 also include spot color settings that are user-specified CMYK values as aliases. TRCs 110, ICC profiles 112, and spot colors 305 are used to enable color printing operations at printing device 104. TRCs 110 also may include TRC settings 302, which can include end point targets, ink limits, and other settings. ICC profiles 112 also may include ICC profile settings 304, which may include ink limits and other settings. DFE 106 applies color printing resources 108 during color printing operations. A TRC may be applied to the electronic image prior to printing the color image so the reflectance of the print job closely approximates to the luminance intent implied by the electronic image. An ICC profile may be applied as disclosed above.

As printing device 104 is used for printing, color printing capabilities may degrade or change over time. Recalibration or other processes may be done to keep the color printing capabilities current. Further, settings may be changed for color printing resources 108. TRCs or ICC profiles also may be added for new papers being used on printing device or deleted if not being used any longer. Thus, update 306 may be received at DFE 106 for printing device 104. Update 306 may be used when one of color printing resources 108 is added, removed, or edited. DFE 106 notes that a change is made to color printing resources 108. For example, an ICC profile 112 may be removed or have an ink limit changed.

This change also should be reflected in the information available to the connected printing devices in the peer-to-peer network. As disclosed above, printing device 104 may be connected to printing device 120 over connection 150 so that DFE 106 communicates directly with DFE 122. DFE 106 may send a signal 301 to DFE 122 that update 306 occurred in color printing resources 108. DFE 122 may use a subscription to receive signal 301 so that it is alerted when color printing resources 108 on printing device 104 are updated.

DFE 122 includes color printing resources 123. Color printing resources 123 includes TRCs 124 along with TRC settings 308 and ICC profiles 126 along with ICC profile settings 310 as well as spot colors 311. Update 306 does not directly impact color printing resources 123 as these are tied to printing device 120 and its color printing capabilities. For example, TRCs 110 may not be applicable for color printing operations on printing device 120. Printing device 120 may include different papers than printing device 104, for example.

DFE 122, however, is synchronized with printing device information 118, which is shared between the printing devices in the peer-to-peer network. Each printing device should have its own version of printing device information 118 for use with synchronizing. Thus, DFE 106 updates the information for printing device 104 within printing device information 118. Printing device file 312 may correspond to printing device 104, printing device file 314 may correspond to printing device 120, and printing device file 316 may correspond to printing device 130. Printing device file 312 is updated at DFE 106. In turn, after DFE 122 receives signal 301 that an update occurred at DFE 106, it may access printing device information 118 at DFE 106 and synchronize its information with its version at printing device 120. This way, the information available at the printing devices within the peer-to-peer network is kept current.

It should be noted that configuration information 105 also may be updated in the same manner and printing device information 118 informed, as well as the printing device information available at DFE 122 synchronized in the same manner. Further, the same operations may be performed at printing device 130 and DFE 132. Moreover, if changes or updates occur with the color printing resources for printing devices 120 and 130, then signal 301 is sent to the other printing devices within the peer-to-peer network and the printing device information at those printing devices synchronized accordingly.

Figure 4:
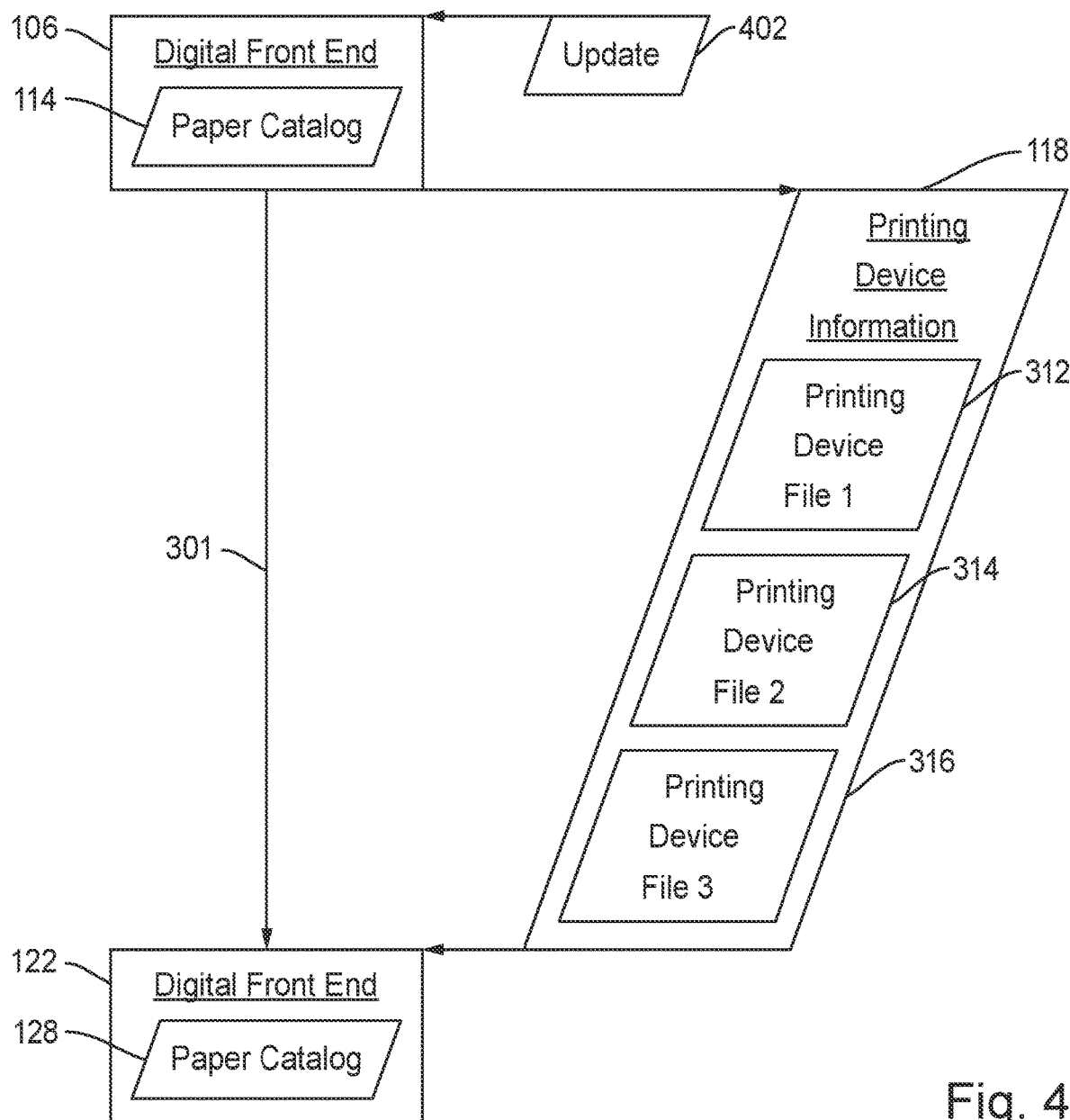
FIG. 4 illustrates a block diagram of a paper catalog being updated in the peer-to-peer network according to the disclosed embodiments.

FIG. 4 illustrates a block diagram of a paper catalog being updated in the peer-to-peer network of the printing devices of system 100 according to the disclosed embodiments. The updates to a paper catalog may be treated in much the same way as the updates to color printing resources disclosed above. Paper catalogs, however, may differ from color printing resources.

A production printing device includes a paper catalog that contains pertinent information of all the paper types that the printer can use. The paper catalog may represent each paper type with a global unique identifier and an external identifier for each paper type or resource. The external identifier may be used within a printing device while the global unique identifier is used for synchronization purposes and will span multiple printing devices. Information also may be stored for each paper type or resource under these identifiers. Example fields of information may include paper weight (e.g., 65 lb), coating (e.g., matte, glossy, or none), brightness, whiteness, shade, ICC profile, and XYZ white point, among others. Each ICC profile may be made for the paper type and may have a specific white point. The ICC profiles used in production printing may assume viewing in a D50 illuminate, which is a white light used in print shop judgments. In addition, ICC profiles specify forward and reverse mappings in the form of LUTs with contents that are not absolute measurements of L*a*b*. Instead, the contents are adjusted with the assumption that the viewer is chromatically adapted to the paper's white point.

Each printing device may include its own paper catalog for the papers loaded at the respective printing device. Thus, paper catalog 114 differs from paper catalog 128. An update 402 may be made to paper catalog 114, which results in signal 301 being sent to DFE 122 to synchronize its printing device information 118 with the printing device information of DFE 106, much like the color printing resources embodiments disclosed above. A closer look at paper catalog 108, however, is provided below.

Figure 5:
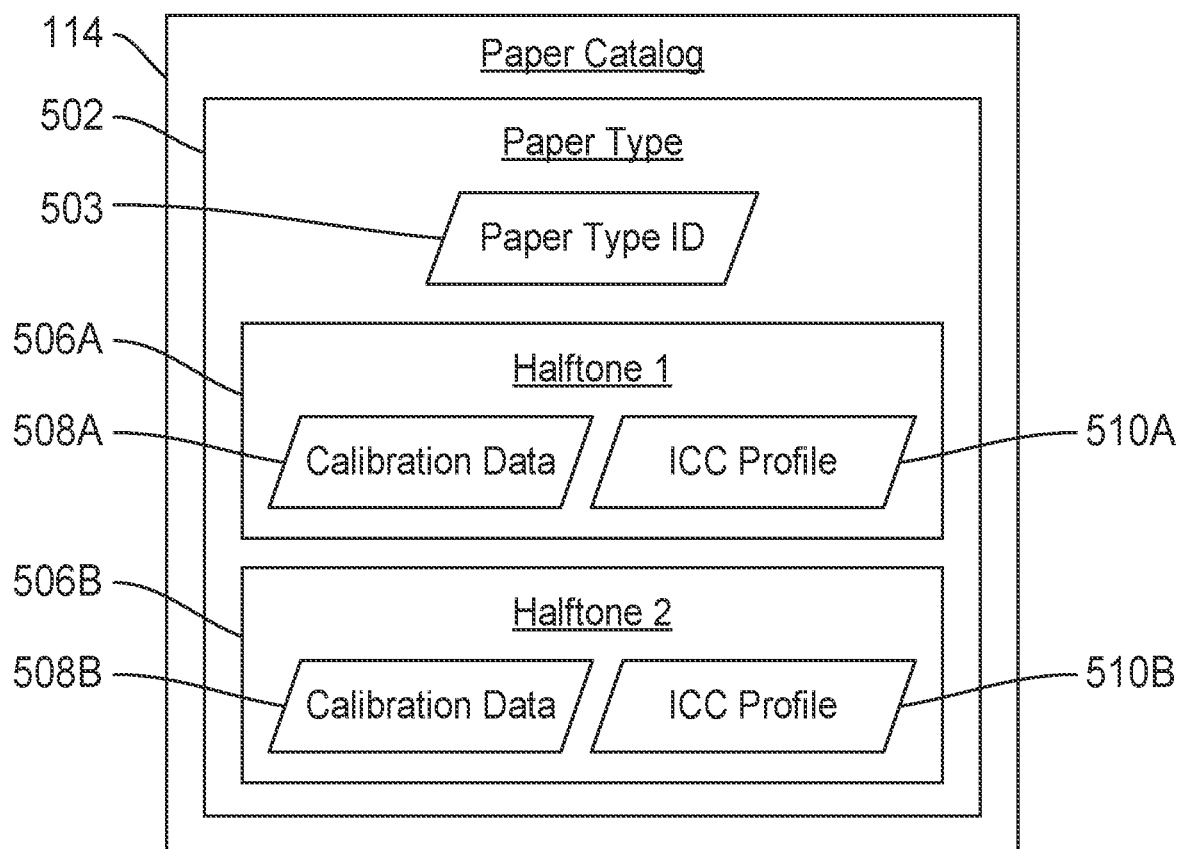
FIG. 5 illustrates a paper catalog according to the disclosed embodiments.

FIG. 5 illustrates a paper catalog 114 according to the disclosed embodiments. The embodiments disclosed in FIG. 5 also may apply to paper catalogs 128 and 140 of printing devices 120 and 130, respectively. Each paper catalog may differ from the others depending on the printing resources, papers, and media at the respective printing device. Although paper catalog 114 of printing device is referred to below, the features disclosed therein also applies to paper catalogs at other printing devices.

For each paper type used at printing device 104, there are a set of items that work together to achieve optimal color reproduction capabilities. These items may be represented in paper catalog 114. An example of an entry in paper catalog for a paper type 502 may be shown. Paper catalog may include hundreds or thousands of such entries. Paper type 502 may be identified within paper catalog 114 by paper type identification 503. In some embodiments, paper type identification 503 may be a unique symbol or code that identifies paper type 502 within paper groups, disclosed in greater detail below.

As shown in FIG. 5, halftones, or halftone designs, may be defined. Printing device 104 may have one or more halftones. Halftones are binary on/off dot patterns of each ink to mimic continuously varying transitions. One halftone could emphasize details in the image, while another could be best for smooth transitions. Thus, the disclosed embodiments may include halftone 506A and halftone 506B. For example, halftone 506A may correspond to the halftone design to emphasize details in the image being printed. Halftone 506B may correspond to the halftone design to provide for smooth transitions.

For each halftone, the print shop should capture the desired per-colorant behavior over all shades of that colorant. By behavior, the disclosed embodiments refer to the color measurement. The record of these colorant behaviors, and the information that allows printing device 104 to be adjusted back to such behaviors, are stored as calibration data. These adjustments may vary linearly or with a curve. The calibration data include characteristics of each ink under the halftone selected. Thus, halftone 506A includes calibration data 508A and halftone 506B includes calibration data 508B.

Further, with a selected halftone, and the calibration data enforced to produce desired behavior of each colorant, the disclosed embodiments then create an ICC profile to fully characterize how ink combinations relate to standardized color measurements, as disclosed above. It is via the ICC profile that, for the specific paper-halftone-calibration-data set up, printing device 104 can reproduce the colors of original document. The process for generating an ICC profile is disclosed above. Thus, halftone 506A includes ICC profile 510A and halftone 506B includes ICC profile 510B.

Often printing systems have additional "dials" for more customized controls. For instance, there are settings of total ink amounts allowed in the ICC profile for preserving the glossy finish of a paper. Alternatively, it could be a very conservative expectation of the black ink response set into the calibration data. These more specific customizations may be identified as print conditions. In the scheme of the aforementioned items affecting color management, the disclosed embodiments place print conditions at the highest tier under each paper type, as shown in FIG. 5 by print condition 504.

Paper type 502 along halftones 506A and 506B may refer to the color management resources and items for one paper type. In a print shop, for each model of printing device, there may be dozens or more paper types in use. To keep track of the color management items for all these papers, paper catalogs may be implemented in system 100. As disclosed above, paper catalog 114 may be a software data storage system that archives all the color management items and resources for each paper type in use. When a print job is specified on a particular paper, identified as paper type identification 503, employing halftone 506A, paper catalog 114 will provide the proper corresponding calibration data 508A and ICC profile 510A for printing device 104 to use. If the print job specifies employing halftone 506B, then paper catalog 114 will provide calibration data 508B and ICC profile 510B for printing device 104 to use for the print job.

As may be appreciated, papers may be added and removed from paper catalog 114. Update 402 may add a paper to paper catalog 114 that is being implemented at printing device 104. A paper type 502 is added to the paper catalog along with the associated information disclosed above. DFE 106 sends signal 301 to DFE 122, which includes its own paper catalog 128. Paper catalog 128 is not directly impacted by update 402 as the paper is not being added to printing device 120. Printing device information 118, however, for the printing devices needs to be updated. Printing device file 312 may be updated with the change in paper catalog 114. In some embodiments, printing device file 312 may include a copy of paper catalog 114. As printing device information 118 is updated at DFE 106, this information is synchronized with the printing device information stored at DFE 122. The same process may be done for DFE 132 of printing device 130.

Figure 6:
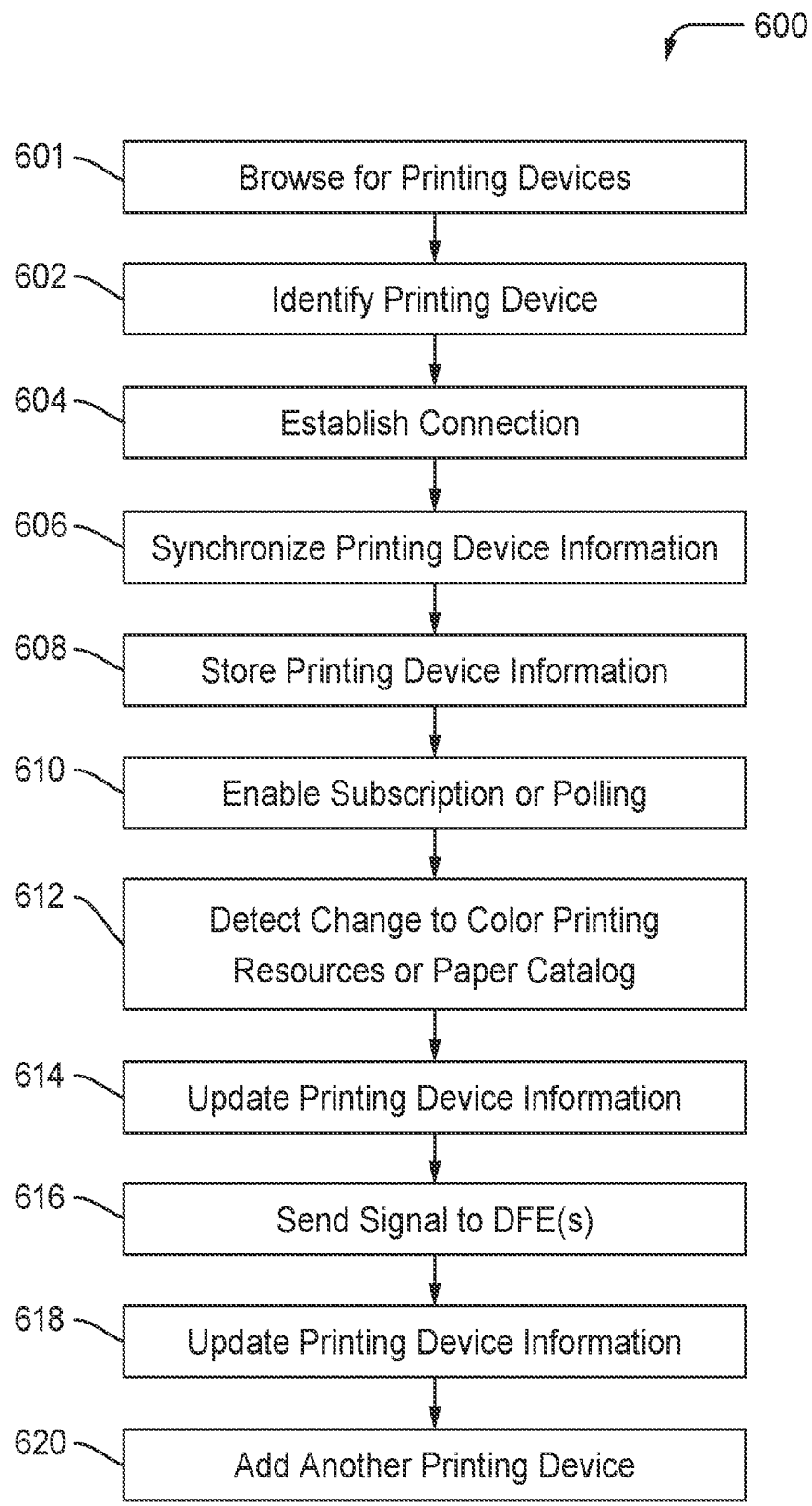
FIG. 6 illustrates a flowchart for managing printing operations within a peer-to-peer network in a printing system according to the disclosed embodiments.

FIG. 6 depicts a flowchart 600 for managing printing operations within a peer-to-peer network in a printing system 100 according to the disclosed embodiments. Flowchart 600 may refer to FIGS. 1A-5 for illustrative purposes.

Flowchart 600, however, is not limited by the disclosure of FIGS. 1A-5 and may include alternate embodiments.

Step 601 executes by browsing for one or more printing devices within printing system 100. For example, an operator or user may browse for printing devices using DFE 106 of printing device 104. At this time, information about the other printing devices may not be available. Step 602 executes by identifying a printing device, such as printing device 120, to establish a connection in order to form a peer-to-peer network for sharing configuration and printing device information.

Step 604 executes by establishing a connection 150 between DFE 106 of printing device 104 and DFE 122 of printing device 120 to form the peer-to-peer network. As shown in FIG. 1A, each DFE may include its own set of color printing resources and a paper catalog. Each DFE also may include configuration information, as disclosed above. With the connection, the operator may view the information used for printing at the second printing device.

Step 606 executes by synchronizing printing device information between DFE 106 and DFE 122. The printing device information includes printing device files for each printing device including its configuration information, color printing resources, and paper catalog. Step 606 is disclosed in greater detail by flowchart 700 below. Step 608 executes by storing printing device information 118 at DFEs 106 and 122 so that each printing device has access to the same information.

Step 610 executes by enabling subscriptions or polling between DFE 106 and DFE 122 using connection 150. Subscriptions may allow notifications, or signals, to be sent between DFEs when something occurs within the respective printing device information stored thereon. Alternatively, the DFEs may poll each other for changes in the printing device information or a status check. If the poll indicates that changes have been made to the shared information, then the disclosed embodiments may perform the steps set forth below.

Step 612 executes by detecting a change, such as update 306 or 402, in the color printing resources or paper catalog at a DFE within the peer-to-peer network between printing devices. Using printing device 104 as an example, DFE 106 receives an update or change to color printing resources 108 or paper catalog 114, as disclosed above. The update or change also may be to configuration information 105. Such an update may be removing or adding a font, or substituting another font. Another example may be ink consumption settings for printing device 104. These same changes may be made at all the DFEs within the peer-to-peer network.

Step 614 executes by updating printing device information 118 at DFE 106 with update 306 or 402 to the color printing resources, the paper catalog, or the configuration information. For example, a setting for TRCs 110 or ICC profiles 112 may be modified. Alternatively, a new paper may be added to paper catalog 114. Step 616 executes by sending a signal 301 from DFE 106 to DFE 122 that an update or change has been made to the printing device information for printing device 104.

Step 618 executes by updating the printing device information at DFE 122 with according to the printing device information currently available at DFE 106. The updating step also may be disclosed by flowchart 700. DFE 122 synchronizes its printing device information for the peer-to-peer network with the printing device information at DFE 106. Step 620 executes by adding another printing device 130 to the peer-to-peer network, if needed. Flowchart 600 may be repeated in order to add new printing devices to the network and sharing of printing device information. Whenever an update or change occurs at any of the printing devices, steps 612-618 may be executed to update the printing device information at all the connected printing devices.

Figure 7:
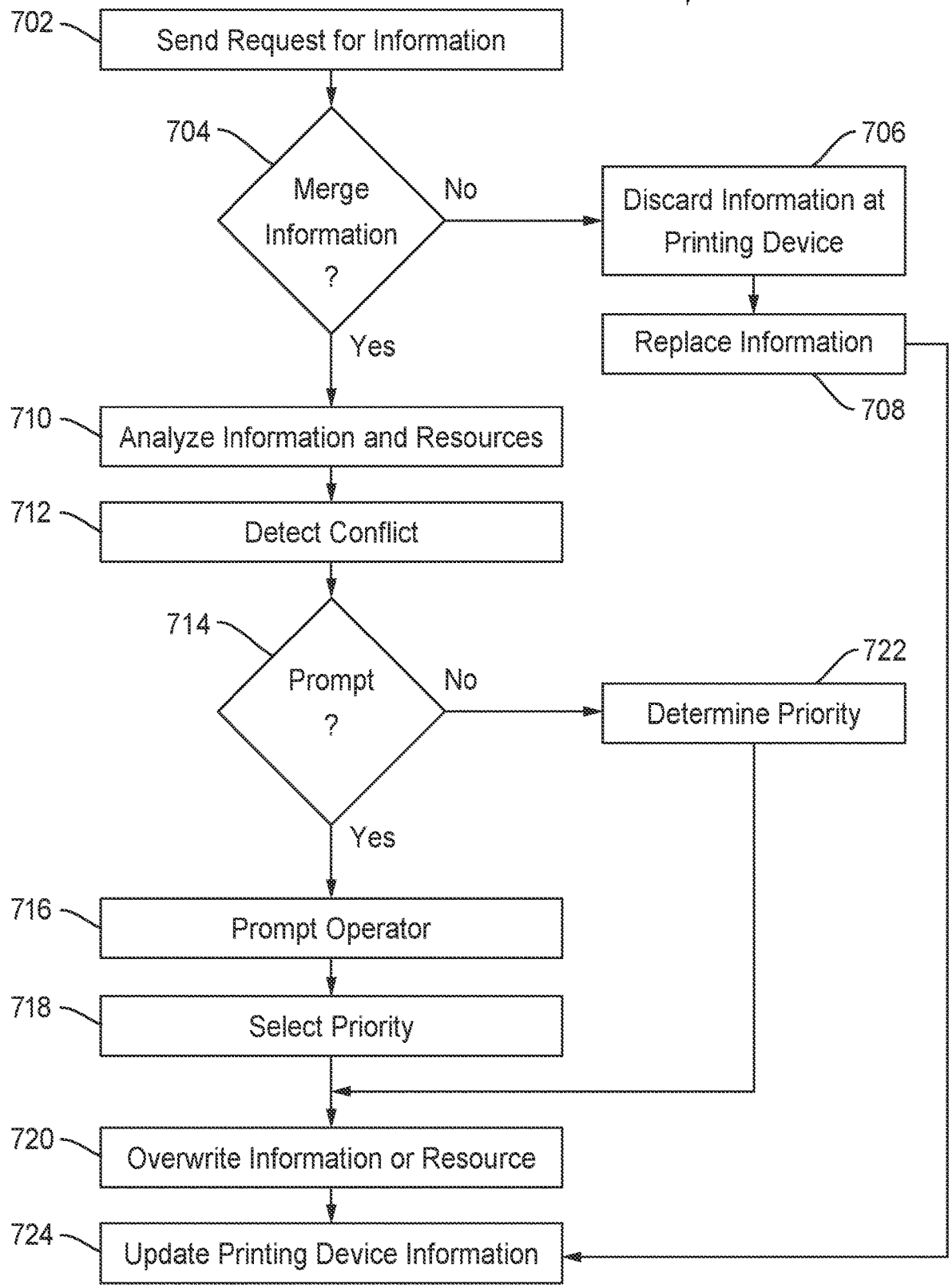
FIG. 7 illustrates a flowchart for synchronizing or updating the printing device information at a printing device according to the disclosed embodiments.

FIG. 7 depicts a flowchart 700 for synchronizing or updating the printing device information at a printing device 120 according to the disclosed embodiments. Printing device 120 is disclosed here as it is synchronizing with information from printing device 104. Flowchart 700 may refer to FIGS. 1A-6 for illustrative purposes. Flowchart 700, however, is not limited by the disclosure of FIGS. 1A-6 and may include alternate embodiments.

Step 702 executes by sending a request to obtain information from the added printing device. Using the above example, DFE 106 may send the request to DFE 122 of printing device 120, which is being added to the network. Step 704 executes by determining whether to merge the configuration information, color printing resources and paper catalog of the new printing device. For printing device 120, the disclosed embodiments determine whether to merge configuration information 125, color printing resources 123, and paper catalog 128 with printing device information 118 at DFE 106. In some instances, printing device information 118 may not have any information or resources about printing device 120, so that none of this is an issue. As such, this step may be skipped. In other instances, DFE 106 and printing device information 118 may have some information about printing device 120. This existing information should be reconciled or synchronized for the peer-to-peer network.

If step 704 is no, then DFE 123 of added printing device 120 is configured to replace information with printing device information 118. Thus, step 706 executes by discarding the information or resources at the added printing device. Step 708 executes by replacing the discarded information with the information from the peer-to-peer network, or printing device information 118. Using the paper catalog example, the disclosed embodiments will discard any paper catalogs that DFE 122 may include from printing device 104 and replace them with the paper catalogs within printing device information 118, such as shown by printing device file 312. The global unique identifiers in printing device information 118 may replace those in paper catalog 128. Flowchart 700 proceeds to step 724, disclosed below.

If step 704 is yes, then DFE 123 will merge its information and resources with that of printing device information 118. Step 710 executes by analyzing the information and resources at DFE 123 with that in printing device information 118. The disclosed embodiments may match the information and resources at DFE 123 against what is available in printing device information 118. Step 712 executes by detecting one or more conflicts between the two sets of information. Using the paper catalog example, the disclosed embodiments may determine that an entry for a type of paper in the paper catalog for printing device 120 differs from that in printing device information 118. To synchronize the two paper catalogs, one of them should discard their information and replace it with the information in the priority paper catalog.

Step 714 executes by determining whether to prompt the operator to determine which set of information takes priority in a conflict. If yes, then step 716 executes by prompting the operator to select which information or resources has the higher priority. Step 718 executes by selecting which set of information or resources has the higher priority. For example, in some instances, the information at DFE 123 may take priority according to the operator, while in others, it is the information within the peer-to-peer network, or printing device information 118.

IF step 714 is no, then step 722 executes by determining the priority based on the configuration of DFE 122. In other words, DFE 122 may be set to select itself or the information from the peer-to-peer group to have priority in case of a conflict. The disclosed embodiments determine which set of information and resources has priority according to the instructions and replaces the conflicted information or resource accordingly.

Step 720 executes by overwriting the information or resource that is conflicted according to the selection or determined priority at DFE 106 and placed in printing device information 118. The priority information replaces the other information at DFE 106 then passed the other DFEs, thereby avoiding the need for a central server. Step 724 executes by updating printing device information 118 for the peer-to-peer network of printing devices. As disclosed above, the updated information is made available to all the printing devices within the peer-to-peer network.

Thus, management of configuration information, color printing resources, and paper catalogs may occur within a print shop without the need for a management server or a centralized synchronization server. Further, the disclosed embodiments eliminate the need for a cloud service to manage the information or resources. The peer-to-peer network may add printing devices and resolve updates or conflicts between the DFEs of the printing devices themselves.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing printing operations, the method comprising:
    connecting a controller of a second printing device to a controller of a first printing device to form a peer-to-peer network, wherein the controller of the first printing device stores a first set of printing resources and the controller of the second printing device stores a second set of printing resources, and
    wherein the first printing device and the second printing device process incoming print jobs separately;
    synchronizing printing device information between the controller of the first printing device and the controller of the second printing device to generate a printing device information data file, wherein the printing device information data file includes the first set of printing resources and the second set of printing resources;
    detecting a change in the first set of printing resources stored at the first printing device;
    updating the printing device information data file stored at the controller of the first printing device with the change in the first set of printing resources; and
    updating the printing device information data file stored at the controller of the second printing device with the change in the first set of printing resources.

2. The method of claim 1, further comprising enabling subscriptions between the controller of the first printing device and the controller of the second printing device to update the printing device information synchronized between the printing devices.

3. The method of claim 1, further comprising adding a controller of a third printing device to the peer-to-peer network, wherein the controller of the third printing device provides a third set of printing resources to the printing device information synchronized between the printing devices.

4. The method of claim 3, further comprising updating the third set of printing resources with the printing device information.

5. The method of claim 4, wherein updating includes replacing the third set of printing resources with the printing device information synchronized between the printing devices.

6. The method of claim 4, wherein updating includes merging the third set of printing resources with the printing device information synchronized between the printing devices.

7. The method of claim 6, further comprising detecting a conflict between the third set of printing resources and the printing device information.

8. The method of claim 7, further comprising overwriting data within the printing device information corresponding to the conflict with data from the third set of printing resources.

9. The method of claim 1, wherein the first set of color printing resources includes at least one of a paper catalog, tone reproduction curves (TRCs), ICC profiles, fonts, spot colors, hot folders, print queues, controller settings, and printing device settings and the second set of printing resources includes at least one of a paper catalog, TRCs, ICC profiles, fonts, spot colors, hot folders, print queues, controller settings, and printing device settings.

10. A method for managing color printing resources between a plurality of printing devices, the method comprising:
    connecting a controller of a second printing device to a controller of a first printing device to form a peer-to-peer network, wherein the controller of the first printing device stores a first paper catalog and the controller of the second printing device stores a second paper catalog, and
    wherein the first printing device and the second printing device process incoming print jobs separately;
    synchronizing the first paper catalog and the second paper catalog by generating a printing resource information data file having each paper catalog available within the peer-to-peer network;
    updating an entry in the first paper catalog stored at the controller of the first printing device; and
    updating an entry of the second paper catalog stored at the controller of the second printing device with the updated entry of the first paper catalog.

11. The method of claim 10, wherein updating the entry in the first paper catalog includes removing the entry from the first paper catalog.

12. The method of claim 10, wherein updating the entry in the first paper catalog includes adding the entry into the first paper catalog.

13. The method of claim 10, wherein updating the entry in the first paper catalog includes editing the entry.

14. The method of claim 10, wherein the entry of the first paper catalog includes printing resources for a paper within the first paper catalog.

15. The method of claim 14, wherein the entry of the second paper catalog includes printing resources for the paper within the second paper catalog.

16. A peer-to-peer printing device network comprising:
- a first printing device having a controller, wherein the controller stores a first set of printing resources;
- a second printing device having a controller, wherein the controller stores a second set of printing resources, wherein the first printing device and the second printing device process incoming print jobs separately; and
- a connection between the controller of the first printing device and the controller of the second printing device, wherein the controller of the first printing device is configured to
- synchronize printing device information including the first set of printing resources and the second set of printing resources between the controller of the first printing device and the controller of the second printing device to generate a printing device information data file, wherein the printing device information data file includes the first set of printing resources and the second set of printing resources,
- detect a change in the first set of printing resources,
- update the printing device information data file stored at the controller of the first printing device with the change in the first set of printing resources, and
- update the printing device information data file stored at the controller of the second printing device with the change in the first set of printing resources.

17. The peer-to-peer printing device network of claim 16, wherein the first set of printing resources includes a first paper catalog and the second set of printing resources includes a second paper catalog.

18. The peer-to-peer printing device network of claim 17, wherein the controller of the first printing device is configured to update an entry of the second paper catalog at the controller of the second printing device with an updated entry of the first paper catalog at the controller of the first printing device.

19. The peer-to-peer printing device network of claim 16, wherein the first set of printing resources includes at least one of a paper catalog, tone reproduction curves (TRCs), ICC profiles, fonts, spot colors, hot folders, print queues, configuration settings, and printing device settings and the second set of printing resources includes at least one of a paper catalog, TRCs, ICC profiles, fonts, spot colors, hot folders, print queues, configuration settings, and printing device settings.

20. The peer-to-peer printing device network of claim 16, further comprising a third printing device having a controller, wherein the controller of the third printing device provides a third set of printing resources to the printing device information synchronized between the printing devices.

* * * * *